United States Patent
Lee et al.

(10) Patent No.: US 7,487,518 B2
(45) Date of Patent: Feb. 3, 2009

(54) DISK LOADING APPARATUS AND METHOD

(75) Inventors: Jung-jae Lee, Yongin-si (KR);
Young-yun Seol, Seoul (KR);
Hwan-seung Lee, Yongin-si (KR);
Byung-soo Chung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 520 days.

(21) Appl. No.: 11/188,797

(22) Filed: Jul. 26, 2005

(65) Prior Publication Data

US 2006/0026618 A1    Feb. 2, 2006

(30) Foreign Application Priority Data

Jul. 29, 2004    (KR) ...................... 10-2004-0059837

(51) Int. Cl.
*G11B 17/04*    (2006.01)

(52) U.S. Cl. ...................................... 720/619

(58) Field of Classification Search ................ 720/619, 720/620, 621, 622, 623, 624; 369/77.1
See application file for complete search history.

(56) References Cited

U.S. PATENT DOCUMENTS

| | | | | |
|---|---|---|---|---|
| 4,523,306 A | * | 6/1985 | Staar | 720/620 |
| 4,969,140 A | * | 11/1990 | Koiwa et al. | 720/621 |
| 6,512,730 B1 | * | 1/2003 | Lee et al. | 720/622 |
| 6,826,766 B2 | * | 11/2004 | Tuchiya | 720/620 |
| 6,880,160 B1 | * | 4/2005 | Lee et al. | 720/623 |
| 2003/0227856 A1 | * | 12/2003 | Kim et al. | 369/77.1 |
| 2004/0163092 A1 | * | 8/2004 | Makisaka et al. | 720/619 |

FOREIGN PATENT DOCUMENTS

| | | |
|---|---|---|
| CN | 1467722 | 1/2004 |
| KR | 2003-94927 | 12/2003 |

OTHER PUBLICATIONS

Office Action issued by the Chinese Patent Office on Nov. 23, 2007 in the corresponding Chinese Patent Application No. 200510088139.7 (9 pages).
Korean Office Action for Application No. 2004-59837 issued Jan. 31, 2006.

* cited by examiner

*Primary Examiner*—Tianjie Chen
(74) *Attorney, Agent, or Firm*—Staas & Halsey LLP

(57) ABSTRACT

Disk loading apparatus and method are provided. The disk loading apparatus includes a main chassis to which a transferring roller for transferring a disk is installed, a transmission unit installed to the main chassis for transferring a power to the transferring roller, a slider installed to the main chassis and moved in a direction of loading and unloading the disk, a first interlocking unit installed to the main chassis for guiding the disk into a chucking position, a second interlocking unit installed to the main chassis and operating in cooperation with the first interlocking unit and the slider, and a locking lever installed to the main chassis for selectively locking the first interlocking unit. It can reduce the number of components, and decrease a power loss generated at the transmission.

4 Claims, 20 Drawing Sheets

DISK LOADING APPARATUS AND METHOD

CROSS-REFERENCE TO RELATED APPLICATIONS

This application claims the benefit of Korean Patent Application No. 2004-59837, filed on Jul. 29, 2004 in the Korean Intellectual Property Office, the disclosure of which is incorporated herein by reference.

BACKGROUND OF THE INVENTION

1. Field of the Invention

The present invention relates generally to a disk loading apparatus. More particularly, the present invention relates to an apparatus and method of selectively loading disks of different sizes.

2. Description of the Related Art

In general, a disk drive records and reproduces information in and from a disk-shaped medium such as CD, digital video disk (DVD), DVD-ROM or the like. The disk drive includes a loading apparatus for loading the disk into a certain position at which information is recorded and reproduced in and from the disk. After the disk is injected into a body of the disk player by means of the loading apparatus, the disk is positioned on a turntable, and is then clamped by a chucking unit to be ready for rotating. During rotation of the disk on the turntable, an optical pickup moves in a radial direction of the disk to record the information in the disk or reproduce the information from the disk.

In particular, due to miniaturization and spatial limitations of the disk player, a disk loading apparatus is recently employed to directly load the disk without a disk tray. In addition, another disk loading apparatus capable of loading disks of different sizes, such as 80 mm or 120 mm, is utilized.

FIG. 1 is a schematic view depicting a conventional disk loading mechanism for a disk drive.

In FIG. 1, the disk loading mechanism includes a locking lever 12, a first guide lever 13, a second guide lever 14, a pushing lever 15, a sliding member 16 (FIG. 6), first and second interlocking levers 17 and 18, and a slider 20.

The locking lever 12 selectively locks the first guide lever 13, and the first and second guide levers 13 and 14 guide a disk 1 or 2 (FIG. 8) to be loaded into a chucking position. The pushing lever 15 is pushed by the disk 1 of 120 mm to push the slider 20. The pushing lever 15 pushes the slider 20 in cooperation with the first and second interlocking levers 17 and 18 interlocked with the second guide lever 14 upon the loading of the disk 2 of 80 mm (FIG. 8). The slider 20 pushed by the pushing lever 15 is coupled to the motor 3, and is thus continuously moved. The sliding member 16 (FIG. 6) is moved to the right in cooperation with the moving slider 20 to unlock the first guide lever 13, and is interlocked with the second guide lever 14 to release the guide pins 13a and 14a provided at the first and second guide levers 13 and 14.

A process of loading the disk 1 of 120 mm will now be described with reference to FIG. 1.

The disk 1 of 120 mm is injected in a front direction A of the disk player. The injected disk 1 abuts against a transferring roller 11 installed to an inside of the main chassis 10. At that time, it is determined by a sensor (not illustrated) whether the disk is injected or not, and the motor 3 is driven by a signal from the sensor to rotate the transferring roller 11. The disk 1 is injected into the main chassis 10, as illustrated in FIG. 2, and comes into contact with the pin 12a of the locking lever 12 to push out the pin 12a. The rotation of the locking lever 12 causes the locking boss 12b to be released from the first locking groove 13b of the first guide lever 13.

As illustrated in FIG. 3, as the disk 1 is injected, the disk comes into contact with the guide pin 13a of the first guide lever 13 and the guide pin 14a of the second guide lever 14 to push out the pins 13a and 14a. Each of the levers 13 and 14 is pushed by the disk 1 completely injected into the chucking position, and is rotated in an opposite direction to each other. As illustrated in FIG. 4, the locking boss 12b of the locking lever 12 is locked into a second locking groove 13c of the first guide lever 13 to fix the first guide lever 13. The second guide lever 14 is also fixed in cooperation with the first guide lever 13. The disk 1, when moved into the chucking position, pushes and rotates the left end 15a of the pushing lever 15. The right end 15b of the pushing lever 15 pushes the slider 20 in the direction B.

FIG. 5 is a right view of FIG. 4. In FIG. 5, when the slider 20 is moved in the direction B, the idling drive gear 4 meshes with the rack gear 21. Therefore, the slider 20 is continuously moved in the direction B in cooperation with the drive gear 4 and the rack gear 21.

As illustrated in FIG. 6, a guide pin 23 of the slider 20 moving in the direction B is moved along a cam groove 16a of a sliding member 16 to operate the sliding member 16 in a right side thereof. While the sliding member 16 is moved in the right side, a desired shape of a flange 16b contacts and pushes a guide pin 12c provided at a right end of a locking lever 12 to release a locking boss 12b from a second locking groove 13c. A guide pin 14b of a second guide lever 14 is guided along a cam groove 16c of the sliding member 16. As the first and second guide levers 13 and 14 are further rotated by the cooperation with each other, the guide pins 13a and 14a are spaced apart from the disk 1. The pushing lever 15 is pushed by the slider 20, which is spaced apart from the disk 1.

FIG. 7 is a right view of FIG. 6. In FIG. 7, while the slider 20 is moving, the chucking lever 30 is moved down along the cam groove 25 of the slider 20 to chuck the disk 1, so that the disk is seated on the turntable.

A process of unloading the disk 1 is implemented in a reverse order of the loading process.

A process of loading a disk 2 of 80 mm will now be described with reference to the accompanying drawings. In FIG. 8, a disk 2 is injected into the main chassis 10 in the direction A. Similar to the operation of disk 1, the injection of the disk 2 is detected by a sensor, and the motor 3 is driven by a signal from the sensor to rotate the transferring roller 11. Therefore, the disk 1 is injected into the main chassis 10. The disk 2 is transferred into the chucking position, as illustrated in FIG. 9, to push out the first guide pin 17a provided at the first interlocking lever 17.

As illustrated in FIG. 10, if the guide pin 17a is pushed by the disk 2, the first interlocking lever 17 is rotated in a direction C around the guide pin 14a, and a second interlocking lever 18 is rotated in a direction D by a second pin 17b. A pin 15c of the pushing lever 15 is pulled by the second interlocking lever 18, such that the slider 20 is pushed in the direction B at a certain distance. As such, the slider 20 is moved in the direction B by the drive gear 4, as the state illustrated in FIG. 5. The sliding member 16 is moved to the right side in cooperation with the guide pin 23 of the slider 20, as illustrated in FIG. 11. The guide pin 12c of the locking lever 12 is rotated by the sliding member 16, so that the locking boss 12b is released from the first locking groove 13b. The guide pin 14c of the first guide lever 14 is guided along the cam groove 16c of the sliding member 16 in a certain distance, so that the first and second guide levers 13 and 14 are rotated relative to each other at a certain angle. As such, each of the guide pins 13a and 14a is spaced apart from the disk 2. The chucking lever 30 is moved down, as illustrated in FIG. 7, to chuck the disk to be rotated on the turntable.

In the case of a conventional disk loading apparatus configured as described above, it consists of the first interlocking lever 17, the second interlocking lever 18 and the pushing lever 15 to cause the slider 20 to be cooperatively operated to release each guide pins 13a and 14a from the disk 1 or 2 loaded into the chucking position. This construction requires many components. In particular, since it is required for many interlocking members to cooperatively operate the slider 20, there are some problems of increased power consumption and possibility of malfunction. In addition, the sliding member 16 is utilized to release each guide pins 13a and 14a from the first and second disk 1 or 2, but the sliding member 16 is large and inefficiently transfers the power.

SUMMARY OF THE INVENTION

Additional aspects and/or advantages of the invention will be set forth in part in the description which follows and, in part, will be apparent from the description, or may be learned by practice of the invention.

Accordingly, it is an aspect of the present invention to solve the problems contained in a conventional disk player, and to provide an apparatus and method of loading a disk, which can reduce the number of components and prevent malfunction thereof.

Another aspect of the present invention is achieved by providing an apparatus and method of loading a disk using an improved transmission unit, which reduces loss of power when a guide pin is spaced apart from the disk.

In order to achieve the above and other aspects, there is provided an apparatus for loading disks of different sizes, comprising a main chassis to which a transferring roller for transferring a disk is installed, a transmission unit installed to the main chassis for transferring power to the transferring roller, a slider installed to the main chassis and moved in a direction of loading and unloading the disk, a first interlocking unit installed to the main chassis for guiding the disk into a chucking position a second interlocking unit installed to the main chassis and operating in cooperation with the first interlocking unit and the slider; and a locking lever installed to the main chassis for selectively locking the first interlocking unit.

According to another aspect of the present invention, there is provided, in a disk loading apparatus including first and second interlocking units, a locking lever and a slider, which are installed to a main chassis, a method of loading disks of different sizes into the disk loading apparatus, the disk loading method including the steps of: (a) transferring the disk into the main chassis, (b) rotating the locking lever using the disk, (c) rotating the first interlocking unit using the disk, (d) rotating the second interlocking unit by rotation of the first interlocking unit, (e) moving the slider by rotation of the second interlocking unit, and (f) rotating the first interlocking unit by the movement of the slider.

According to another aspect of the present invention, there is provided an apparatus for loading disks of different sizes, including means for transferring the disk into a main chassis, means for rotating a locking lever using the disk, means for rotating a first interlocking unit using the disk, means for rotating a second interlocking unit by the rotation of the first interlocking unit, means for moving a slider by the rotation of the second interlocking unit, and means for rotating the first interlocking unit by the movement of the slider.

In an embodiment, the first interlocking unit includes a first pivot plate rotatably installed to the main chassis, a second pivot plate rotatably installed to the main chassis in cooperation with the first pivot plate and selectively locked into the locking lever, and a resilient member having one side coupled to the first pivot plate and the other end installed to the main chassis and resiliently biasing the first pivot plate.

In an embodiment, the second interlocking unit includes a pushing lever pivotally installed to the main chassis and coupling the slider to the transmission unit in cooperation with the second pivot plate pushed and rotated by the disk, and a releasing lever pivotally installed to the main chassis and rotating the second pivot plate in cooperation with the slider. The second interlocking unit further includes a resilient member having one side coupled to the main chassis and the other end installed to the pushing lever and resiliently biasing the pushing lever.

In addition, the second pivot plate is formed with first and second locking grooves, the locking lever includes a locking boss locked into the first or second locking groove, and the first locking groove has a width that is wider than that of the locking boss. The second pivot plate is formed with a guide slit having first and second locking portions interlocked with the pushing lever to couple the slider to the transmission unit and guiding a guide pin formed at one end of the pushing lever. At that time, the first locking groove has a width wider than that of a locking boss formed at the locking lever so that the second pivot plate which is not unlocked is rotated when the second disk is injected.

With the construction, the number of interlocking members for coupling the slider to the transmission unit can be reduced, which can decrease the malfunction of the apparatus. In addition, the disk player can be miniaturized because of the reduced number of the components. Furthermore, it can decrease the loss of the power in the process of transferring the power from the disk loaded into the chucking position to the first interlocking unit.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
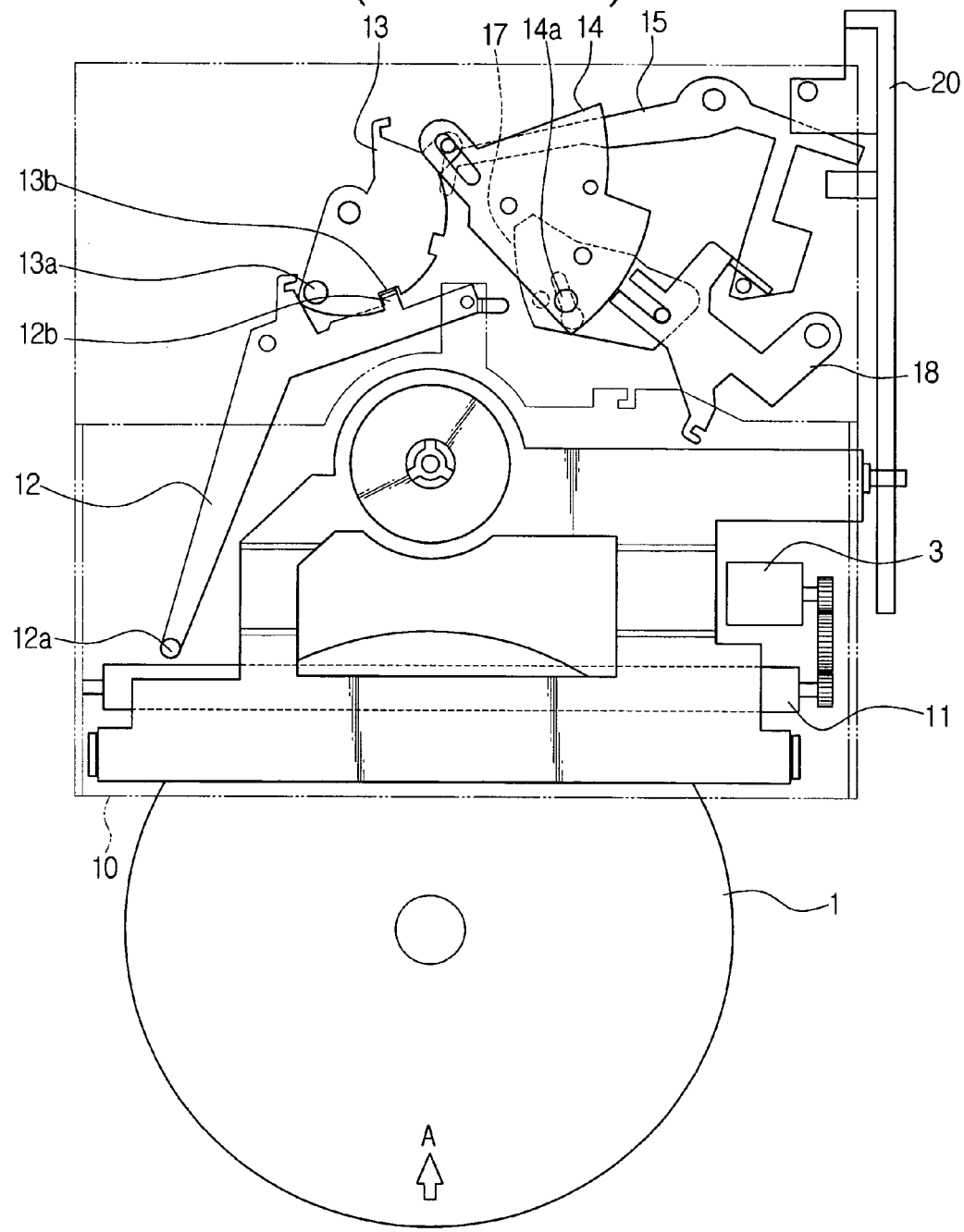
FIG. 1 is a diagrammatic plan view of a conventional disk loading apparatus.
Figure 2:
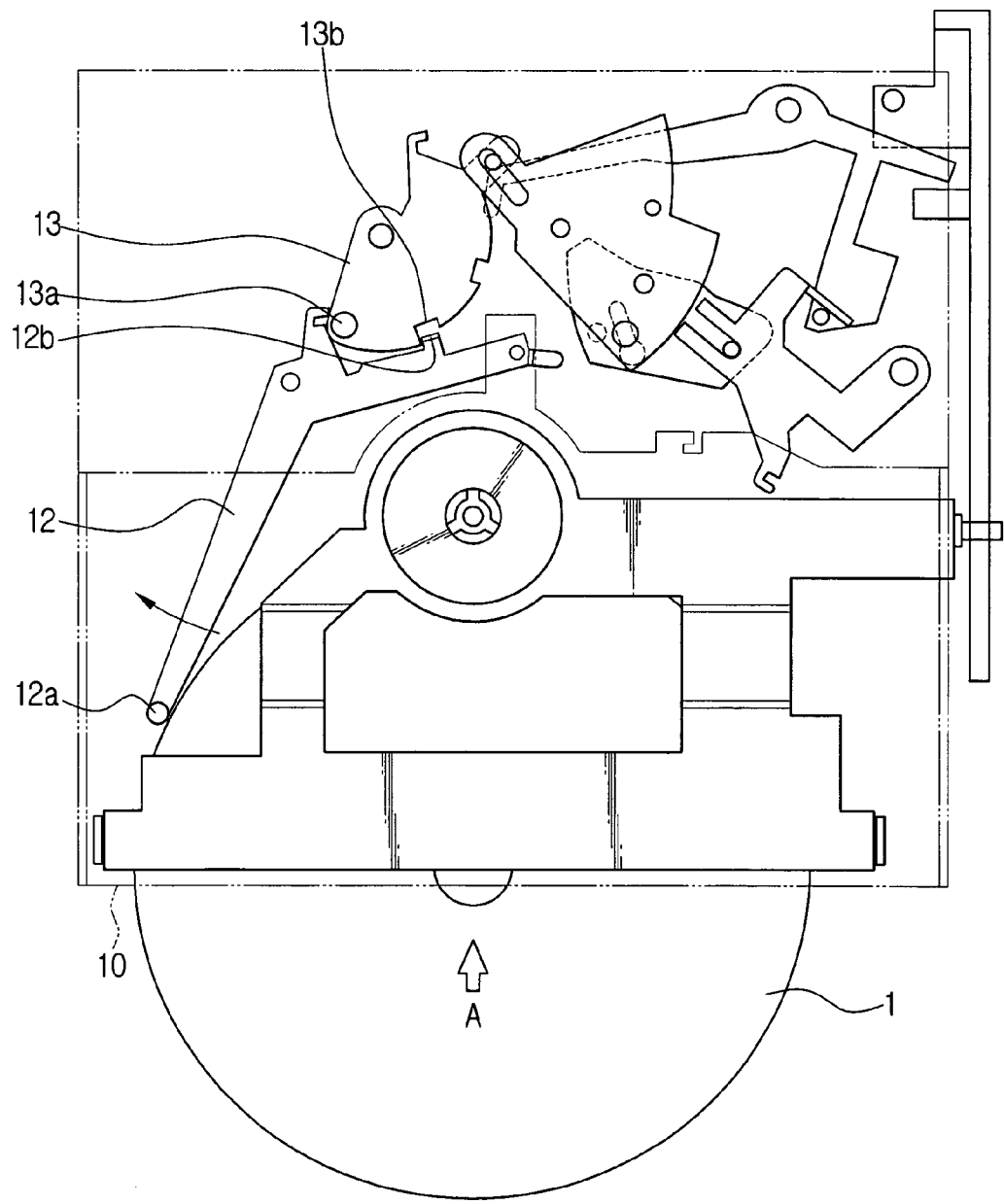
FIGS. 2 through 7 are views illustrating a process of loading a disk of 120 mm onto a conventional disk loading apparatus, respectively.
Figure 3:
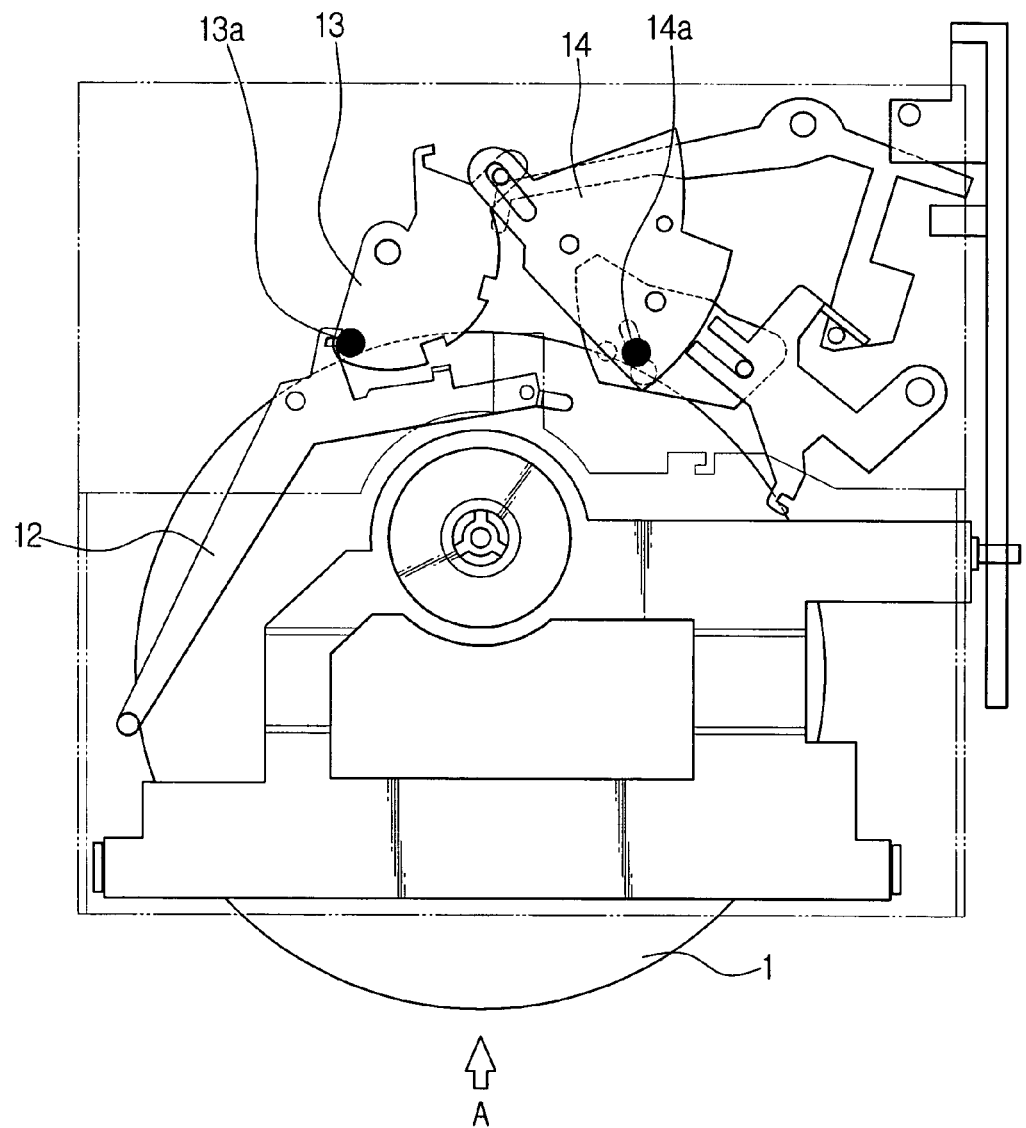
Figure 4:
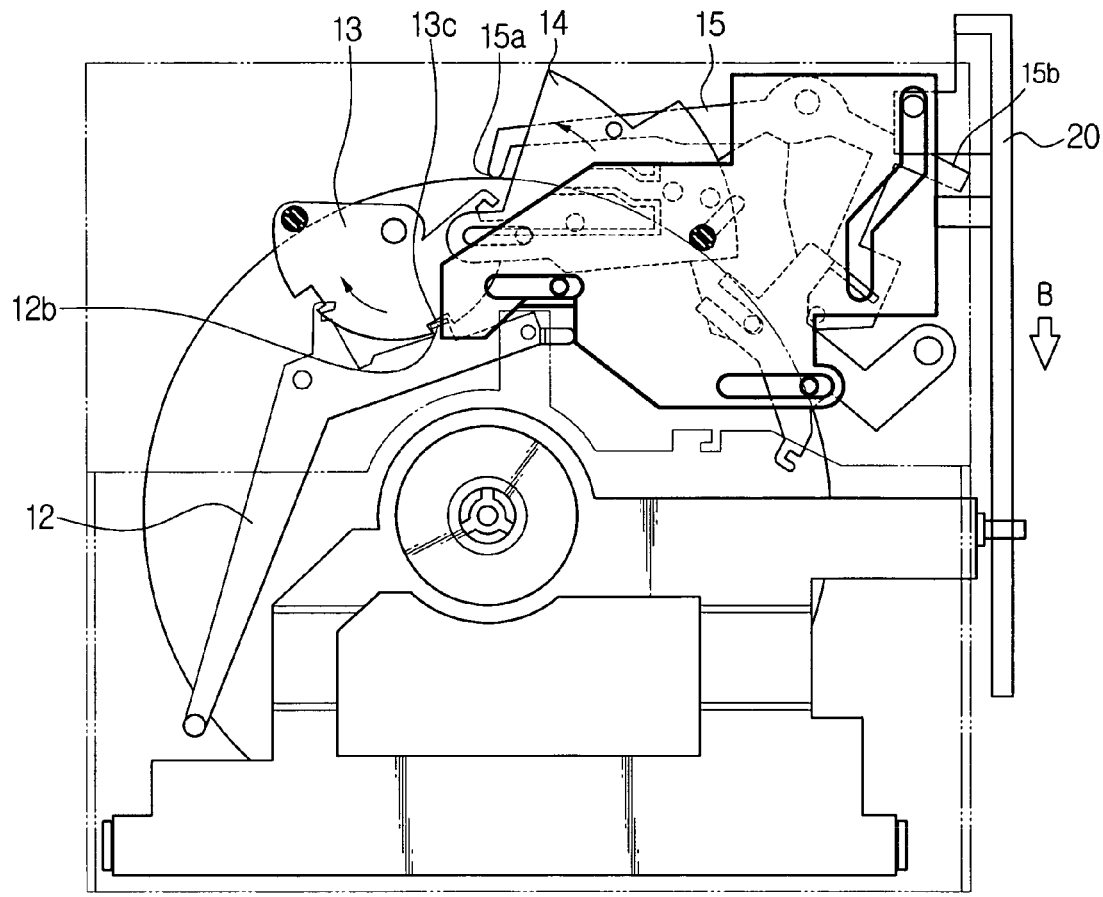
Figure 5:
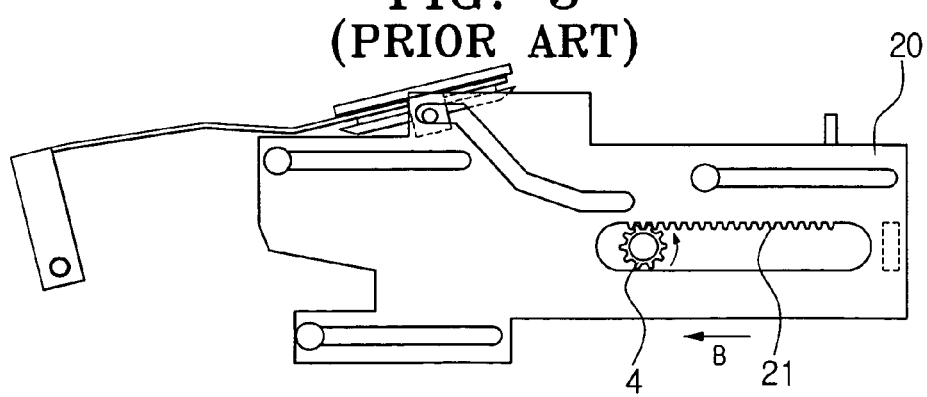
Figure 6:
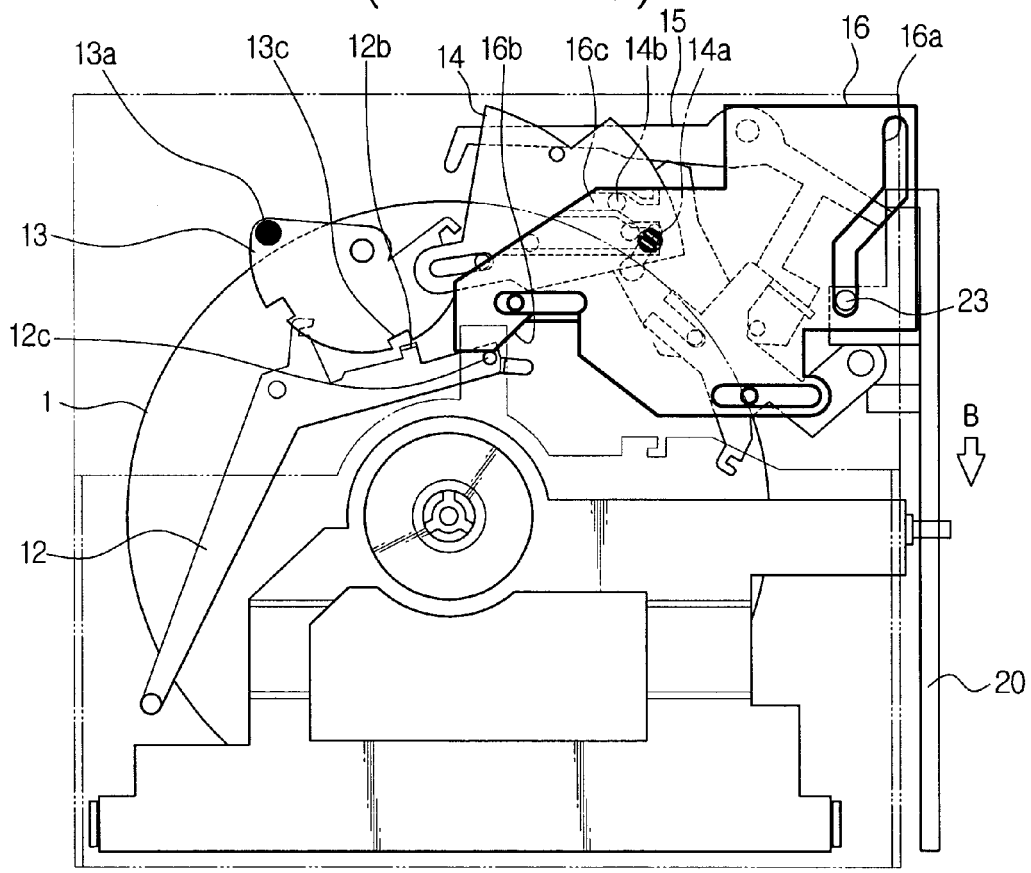
Figure 7:
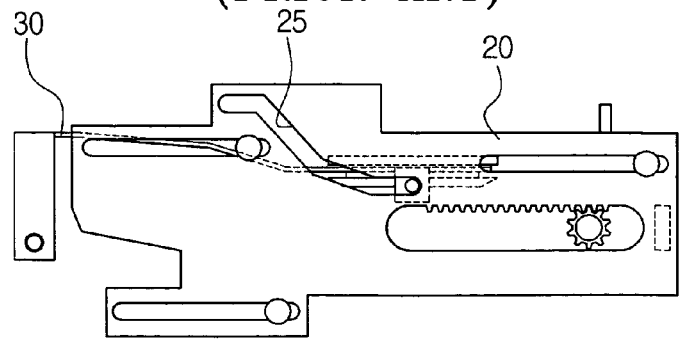
Figure 8:
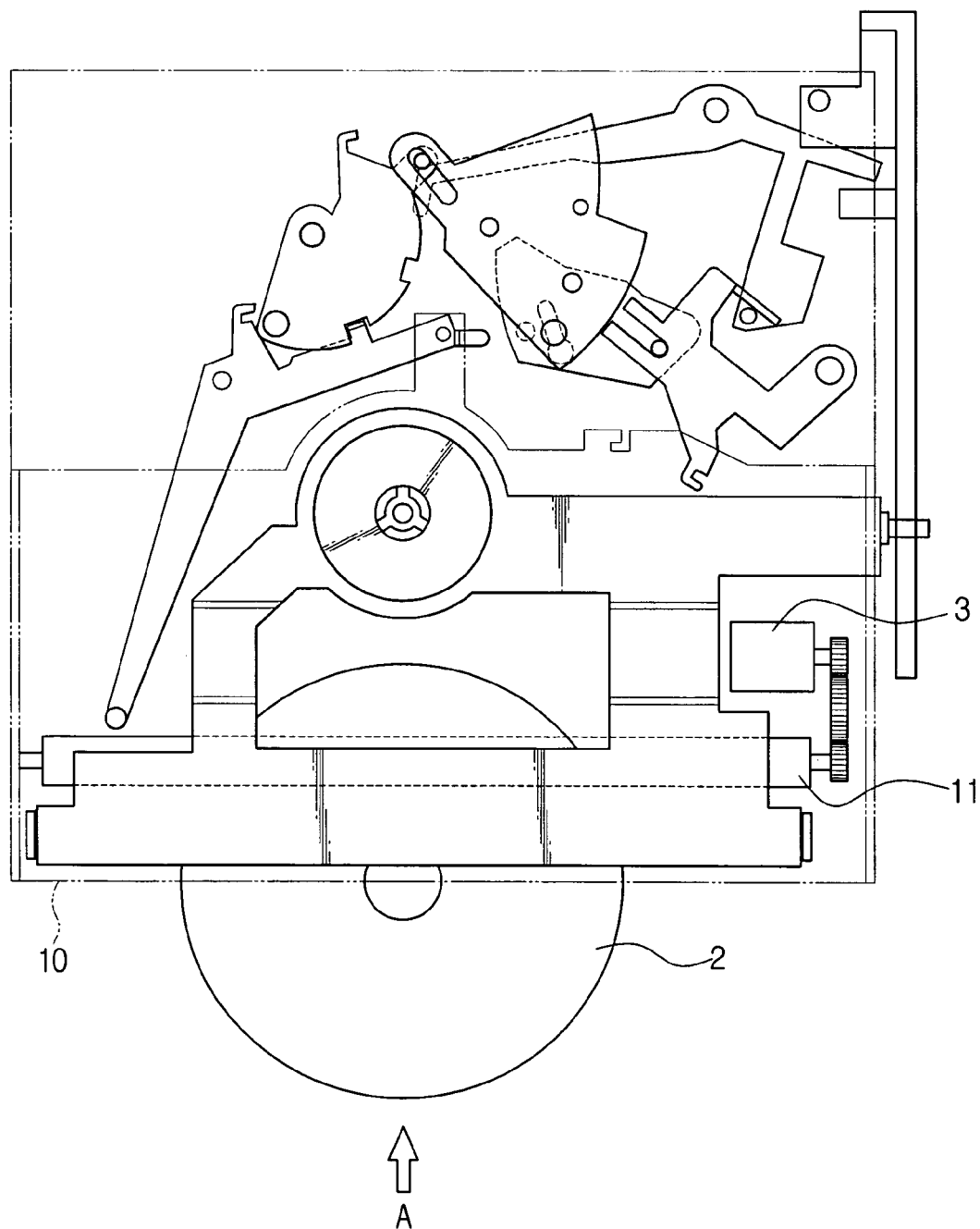
FIGS. 8 through 11 are views illustrating a process of loading a disk of 80 mm onto a conventional disk loading apparatus, respectively.
Figure 9:
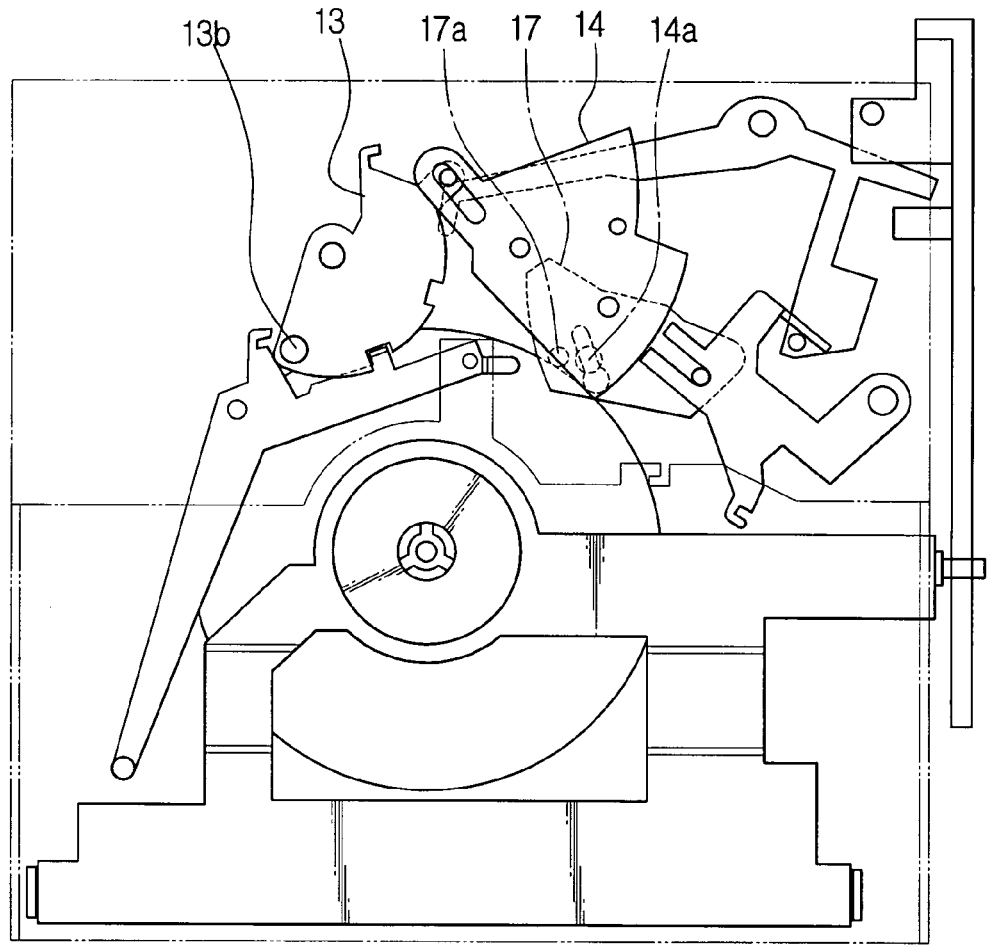
Figure 10:
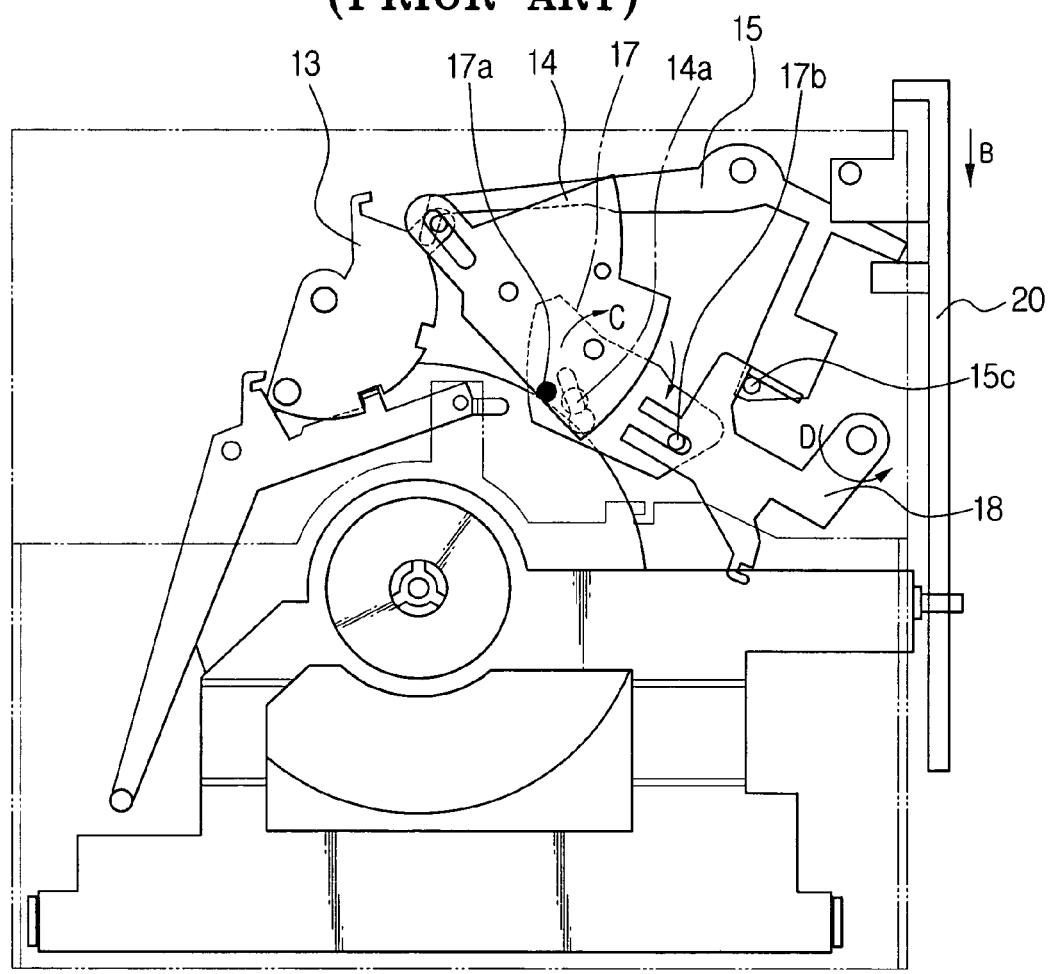
Figure 11:
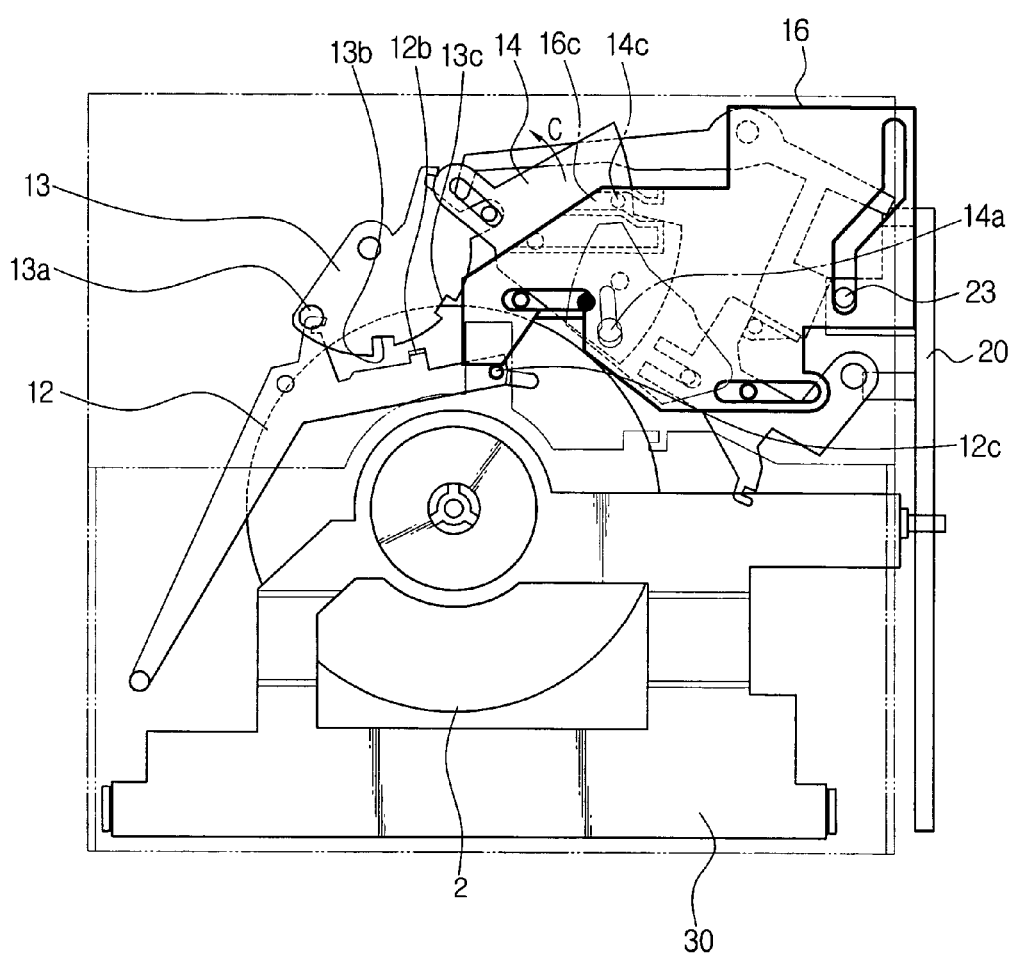

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 12:
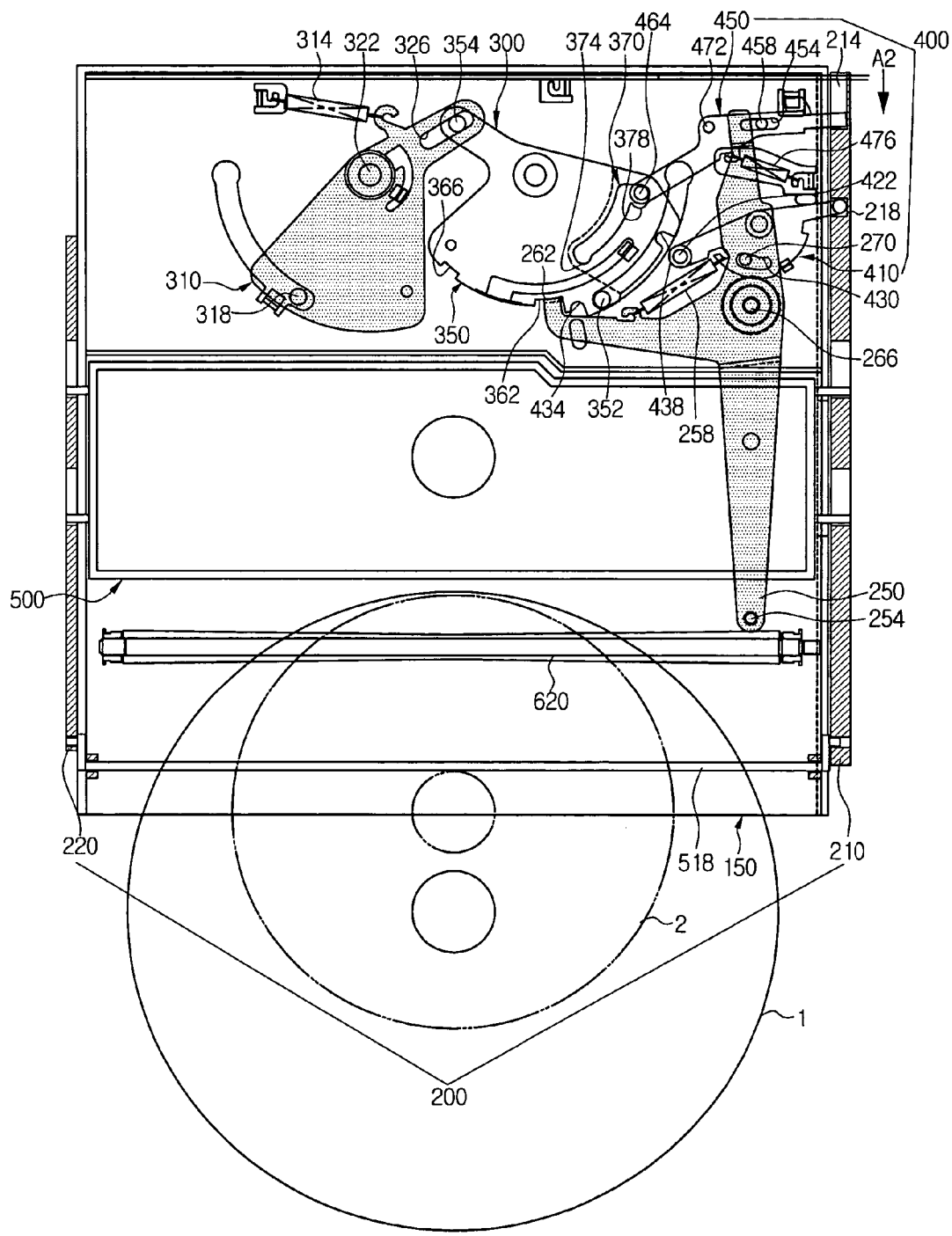
FIG. 12 is a diagrammatic plan view of a disk loading apparatus according to an embodiment of the present invention.
Figure 13:
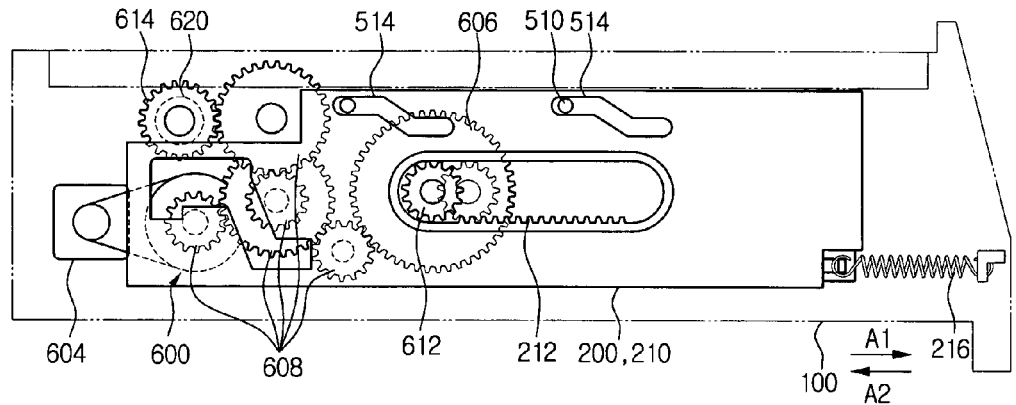
FIG. 13 is a side view of a disk loading apparatus according to an embodiment of the present invention.

FIG. 12 is a plan view of a disk loading apparatus, and FIG. 13 is a right side view of FIG. 12.

In FIGS. 12 and 13, the disk loading apparatus according to an embodiment of the present invention includes a main chassis 150, a transmission unit 600, a slider 200, a first interlocking unit 300, a second interlocking unit 400, and a locking lever 250. A transferring roller 620 is rotatably installed to the main chassis 150. The transmission unit 600 not only transfers power from a drive motor 604 to the transferring roller 620, but also is selectively coupled to the slider 200 to move the slider 200. The second interlocking unit 400 couples the slider 200 to the transmission unit 600 in cooperation with the first interlocking unit 300, and releases the first interlocking unit 300 from the first and second disk 1 or 2 in cooperation with the slider 200. The locking lever 250 selectively locks the first interlocking unit 300 in cooperation with a first disk 1 and the second interlocking unit 400.

Generally, the first disk 1 is a 120 mm disk, while the second disk 2 is a 80 mm disk. The disk loading apparatus according to the embodiment of the present invention is applied to a disk player capable of compatibly loading disks of different sizes without a disk tray.

The transferring roller 620 is rotated by means of the transmission unit 600, and is inserted into a lower portion of the main chassis 150 to move the disk 1 or 2, which is moved from the front of the disk player, into a body of the disk player, or to eject the disk 1 or 2. The transferring roller 620 is supported by means of a hinge unit (not illustrated) at both ends thereof. The hinge unit is pivotally installed to the main chassis 150, and operates in cooperation with the slider 200, such that the transferring roller 620 is rotated in cooperation with the slider 620 to be in contact with or spaced apart from the injected or ejected disk 1 or 2.

Figure 21A:
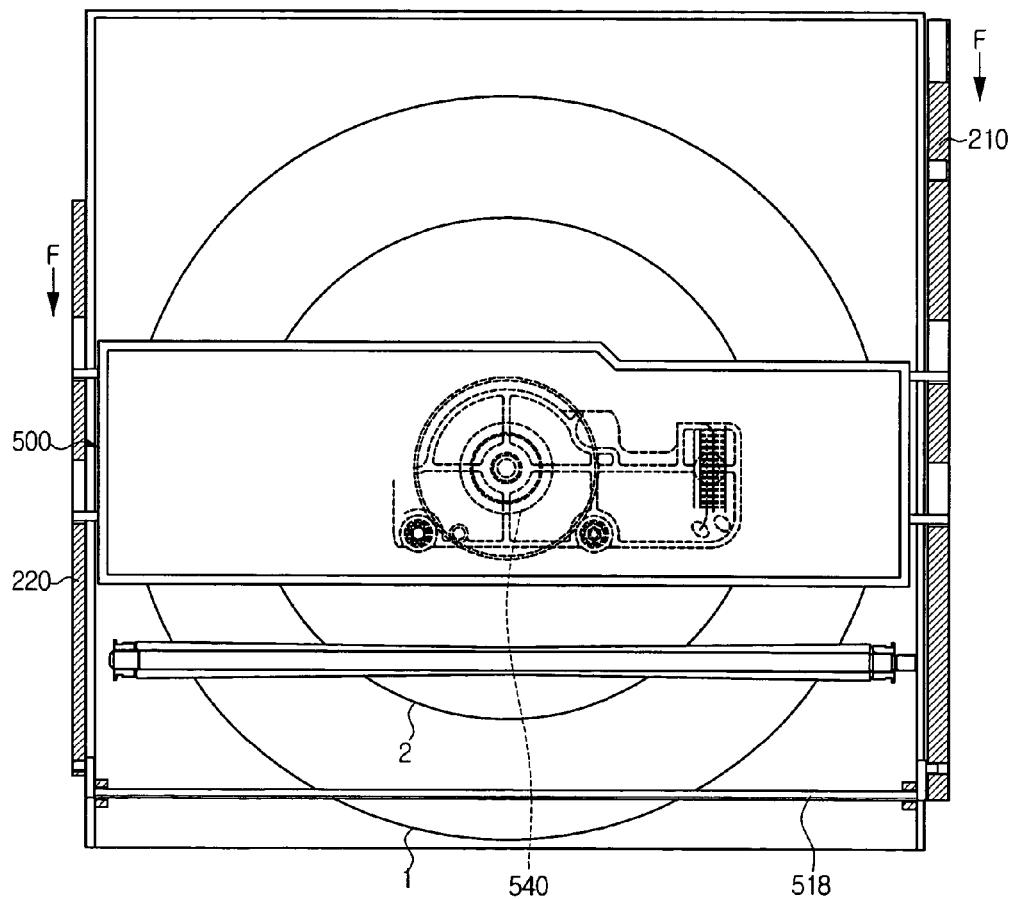
FIGS. 21A, 21B, 22A and 22B are views illustrating a chucking process of a disk loading apparatus according to an embodiment of the present invention.
Figure 21B:
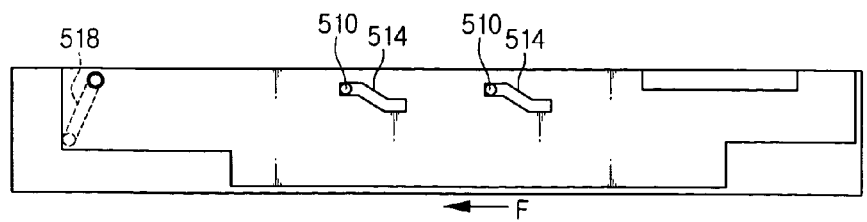
Figure 22A:
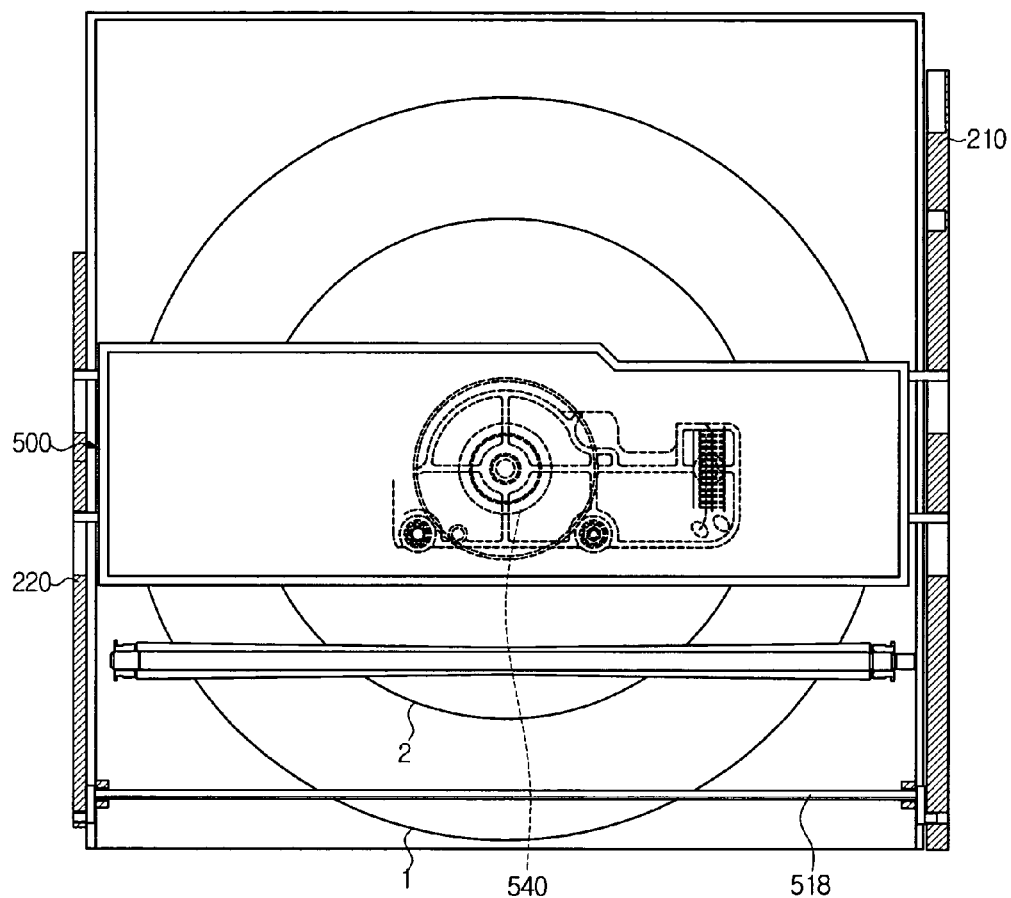
Figure 22B:
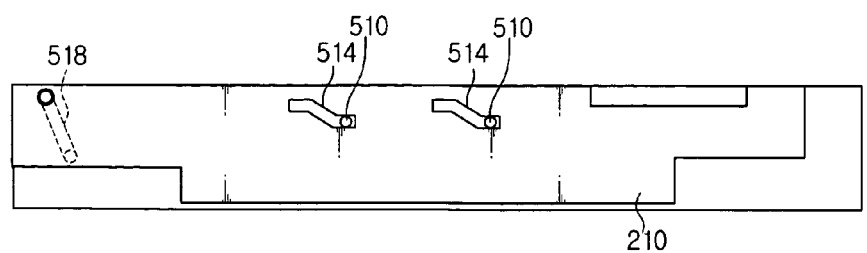

The main chassis 150 is installed to an upper portion of a housing 100 to which an optical pickup (not illustrated) is installed. The main chassis 150 is provided with a chucking unit 500 for chucking the disk 1 or 2 transferred into the chucking position onto a turntable 540 (FIG. 21A).

The transmission unit 600 illustrated in FIG. 13 includes a follower gear 614, a coupling gear 608, a main gear 606, and a driving gear 612. The follower gear 614 is provided at one side of the transferring roller 620 to rotate the transferring roller 620. The coupling gear 608 transfers power from the drive motor 604 to the follower gear 614 and the main gear 606. The main gear 606 is coupled to the coupling gear 608 to receive the power from the drive motor 604. The drive gear 612 has a radius smaller than that of the main gear 606, and is rotated together with the main gear 606. The drive gear 612 is selectively coupled to a rack gear 212 formed at the slider 200 to move the slider 200 in directions A1 and A2. Specifically, the power of the drive motor 604 is transferred to the follower gear 614 through a plurality of coupling gear 608, and the power transferred to the follower gear 614 rotates the transferring roller 620. In addition, the coupling gear 608 transfers the power to the main gear 606, and the power transferred to the main gear 606 is transferred to the drive gear 612 to move the slider 200.

The slider 200 is coupled to the main chassis 150, and may be reciprocated in a loading direction of the disk 1 or 2 to be injected. The slider 200 includes first and second sliders 210 and 220. The first slider 210 and the second slider 220 are coupled to each other through a coupling member 518 which serves to transfer the power from the first slider 210 to the second slider 220. The first slider 210 is formed with the rack gear 212 meshed with the drive gear 612. Until the disk 1 or 2 moves into an initial position, that is, the loading position, the rack gear 212 is spaced apart from the drive gear 612. In addition, the first slider 210 is resiliently biased in a direction A1 by means of a resilient member 216. The first slider 210 is pushed by the second interlocking unit 400 operating in cooperation with the first interlocking unit 300 to be coupled with the drive gear 612, when the first or second disk 1 or 2 is injected. The first slider 210 is provided with first and second interlocking grooves 214 and 218 to cooperatively operate the second interlocking unit 400 when the first slider moves in the direction A1 or A2. The first and second sliders 210 and 220 are provided with a cam groove 514 to cooperatively operate the chucking unit 500 seating the disk 1 or 2 onto the turntable 540 (FIG. 21A).

When the first or second disk 1 or 2 injects into the housing 100, the first interlocking unit 300 is pushed by the first or second disk 1 or 2 to serve to guide the first or second disk 1 or 2 into the chucking position. The first interlocking unit 300 includes a first pivot plate 310, a second pivot plate 350 and a resilient member 314.

The first pivot plate 310 has a first guide pin 318 which comes into contact with the injected first or second disk 1 or 2 to guide the first or second disk 1 or 2 into the chucking position. Also, the first pivot plate 310 has a pivot shaft 322 to rotate on the main chassis 150. The first pivot plate 310 is provided at one end thereof with a hole 326 interlocked with the second pivot plate 350.

The second pivot plate 350 includes a second guide pin 352, a pin 354, first and second locking grooves 362 and 366, first and second releasing grooves 434 and 438, and a guide slit 370. The second guide pin 352 guides the first or second disk 1 or 2 into the chucking position, as the first guide pin 318 of the first pivot plate 310. The pin 354 is inserted into the hole 326 formed at the first pivot plate 310 to cooperatively operate the first and second pivot plates 310 and 350. The first and second locking grooves 362 and 366 are formed at circumference of the second pivot plate 350, and the locking lever 250 is locked into the locking grooves. In addition, the first locking groove 362 has a large width relative to that of the second locking groove 366. When the second disk 2 locked by the locking lever 250 is injected, the locking boss 262 of the locking lever 250 is easily released from the first locking groove 362. The first and second releasing grooves 434 and 438 are spaced apart from each other at a certain interval so that the releasing lever pin 422 of the releasing lever 410 is inserted into the grooves. The guide slit 370 is provided at both ends thereof with a first locking portion 374 and a second locking portion 378, and the guide pin 464 of the pushing lever 450 is selectively locked into the first and second locking portions 374 and 378.

The resilient member 314 has one end fixed to the main chassis 150 and the other end coupled to the first pivot plate 310, thereby resiliently biasing the first pivot plate 310 in a direction opposite to a rotational direction of the first pivot plate 310, upon the loading, to smoothly return the first pivot plate 310.

The second interlocking unit 400 includes a pushing lever 450 and a releasing lever 410, and serves to couple the rack gear 212 of the first slider 210 to the drive gear 612 in cooperation with the first interlocking unit 300, and to rotate the first and second pivot plates 310 and 350 in cooperation with the first slider 210 to release the first and second guide pins 318 and 353 from the first and second disk 1 or 2.

The pushing lever 450 includes a guide pin 464, a slit 454, and a contact pin 472. The guide pin 464 moves along a guide slit 370 formed at the second pivot plate 350. The slit 454 is formed at the pushing lever 450, and a pivot shaft pin 458 installed to the main chassis 150 is inserted into the slit 454 so as to allow the pushing lever 450 to rotate. The slit 454 is extended in a longitudinal direction, so that the pushing lever 450 can rotate around the pivot shaft pin 458. In addition, since the pivot shaft pin 458 is guided along the slit 454, the pushing lever 450 can move linearly. The contact pin 472 is positioned on a left side of the slit 454. The contact pin 472 is selectively contacted with one end of the locking lever 250 to linearly move the pushing lever 450. The guide pin 464 of the pushing lever 450 is unlocked from a first locking portion 374 or a second locking portion 378 each formed at both ends of the guide slit 370 by linear movement of the pushing lever 450. In addition, the pushing lever 450 is coupled to the main chassis 150 through a resilient member 476.

The releasing lever 410 includes a releasing lever pin 422 and a cam groove 430. The releasing lever 410 is pivotally installed to the main chassis 150, and rotates the first and second pivot plates 310 and 350 in cooperation with the first slider 210. The releasing lever pin 422 is inserted into first and second releasing grooves 434 and 438 formed at the second pivot plate 350 to rotate the second pivot plate 350. The releasing lever 410 and the locking lever 250 are coupled to each through the resilient member 258. The resilient member 258 serves to easily lock the locking lever 250 and to smoothly rotate and return the releasing lever 410 to perform the releasing function.

The locking lever 250 is pivotally installed to the main chassis 150, and includes an interfering pin 254, a locking boss 262, a locking lever pivot shaft 266, and a cam boss 270. The interfering pin 254 is provided at one end of the locking lever 250, and comes into contact with the first disk 1 injected into a housing 50. The interfering pin 254 is pushed by the first disk 1 injected to rotate the locking lever 250, and thus, unlock the second pivot plate 350. The locking boss 262 is provided at an end of a lever extended from a center of the locking lever 250 to a left side thereof. The locking boss 262 is inserted into the first and second locking grooves 362 and 366 to selectively lock the second pivot plate 350. The pivot shaft 266 is provided at the center of the locking lever 250, and the cam boss 270 is inserted into the cam groove 430 formed at the releasing lever 410, so that the cam boss 270 is moved along the cam groove 430 to rotate the locking lever 250 when the releasing lever 410 is rotated. At that time, the locking boss 262 is released from the first or second locking groove 362 or 366 to unlock the second pivot plate 350, so that the first and second guide pins 318 and 352 are spaced apart from the first or second disk 1 or 2.

A process of loading the disk according to an embodiment of the present invention will now be described in detail.

First, a process of loading the first disk 1 of 120 mm will now be described.

Figure 14:
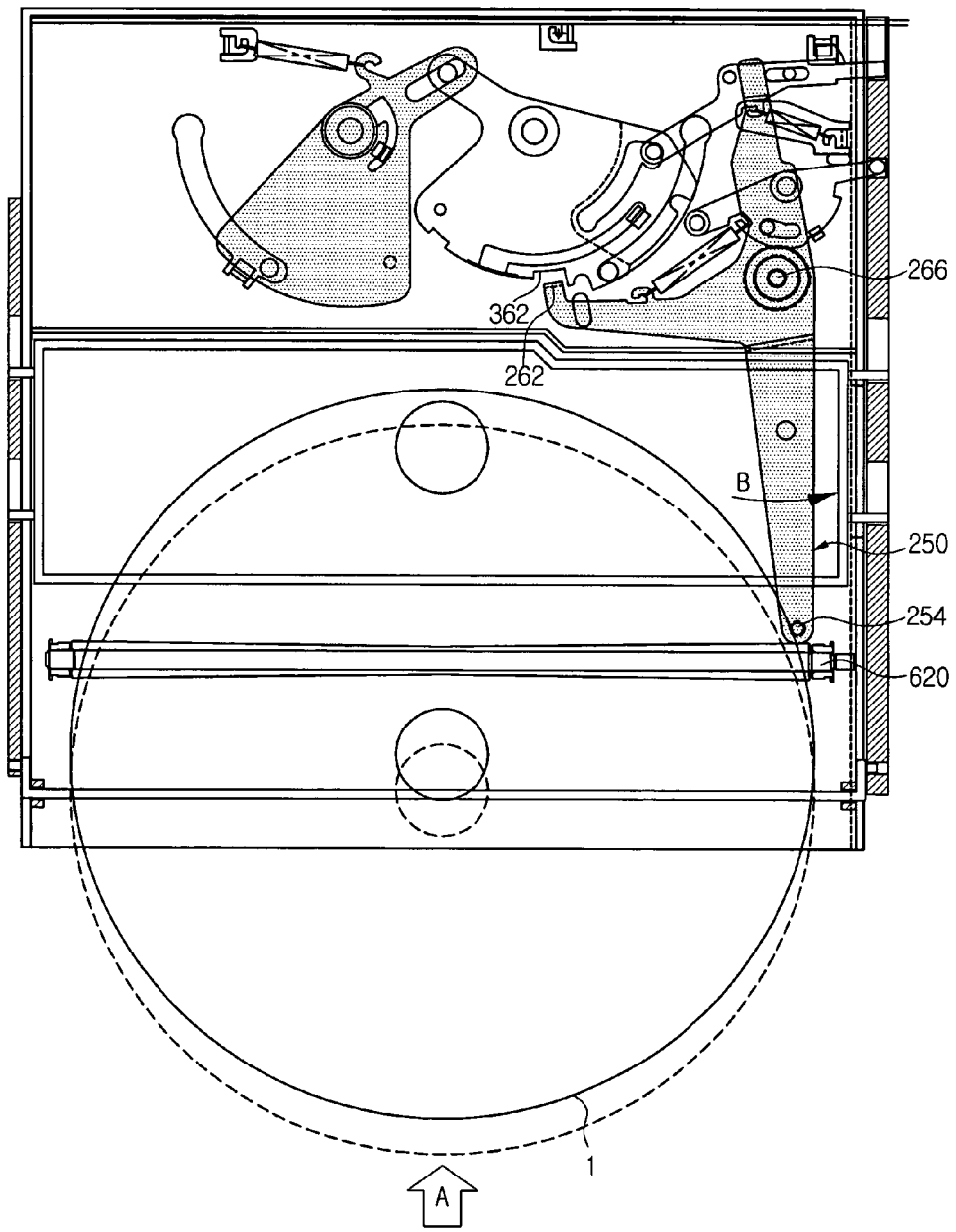
FIGS. 14 through 17 are views illustrating a process of loading a disk of 120 mm onto a disk loading apparatus according to an embodiment of the present invention.

As illustrated in FIG. 14, the first disk 1 is inserted in a loading direction, that is, in direction A, which is injected into the housing 100 (FIG. 13). At that time, it is determined by a sensor (not illustrated) whether the first disk 1 is injected or not. The drive motor 604 (FIG. 13) is driven by a signal from the sensor to rotate the transferring roller 620. As such, the first disk 1 is pulled into the housing 100 (operation S1).

Figure 15:
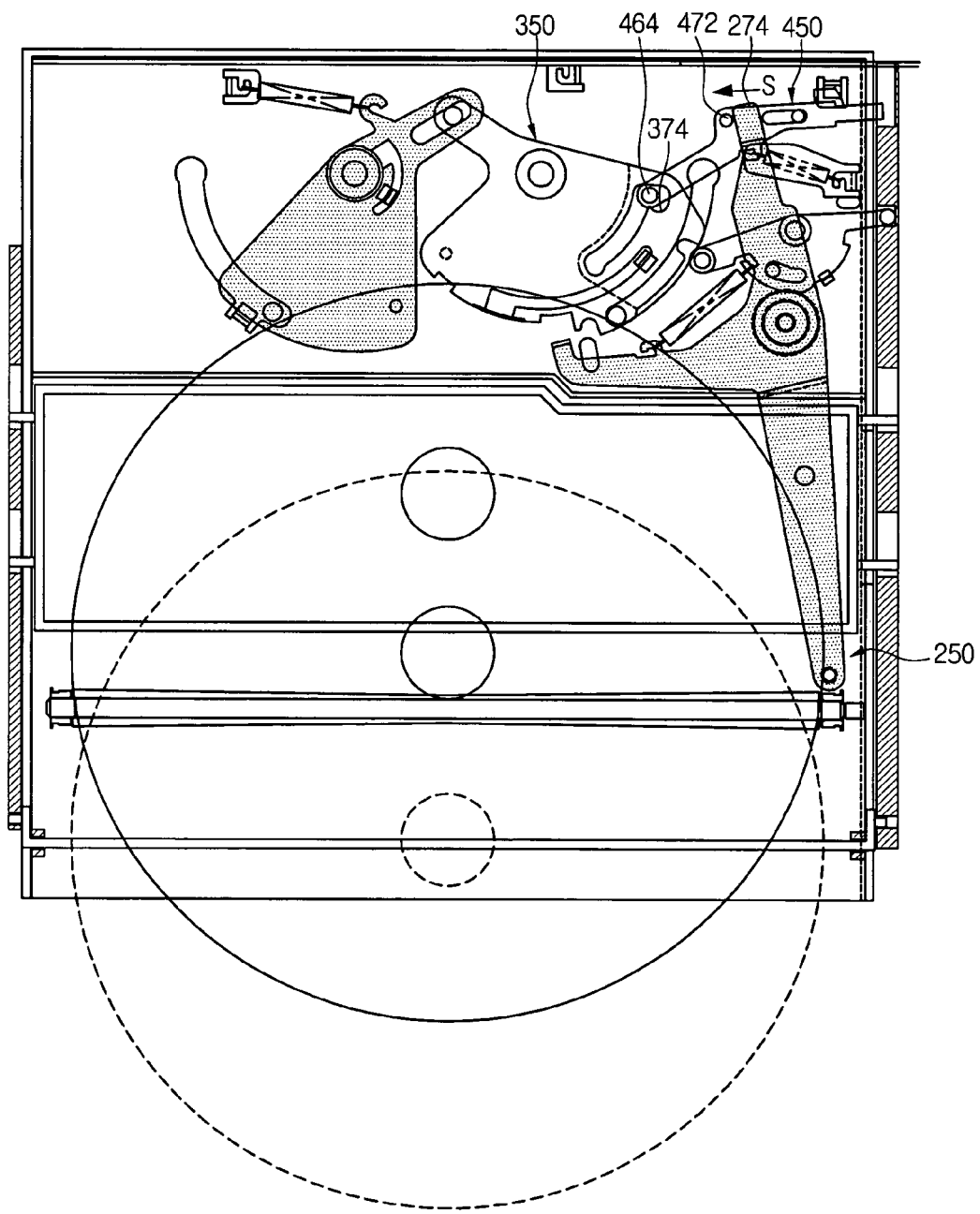

At that time, the first disk 1 is in contact with the interfering pin 254 of the locking lever 250 at an outer periphery of the first disk 1 to push the interfering pin 254. The locking lever 250 is rotated in a direction B around the pivot shaft 266 of the locking lever 250. The locking boss 262 formed at the locking lever 250 comes out of the first locking groove 362 formed at the second pivot plate 350 by rotation of the locking lever 250. As illustrated in FIG. 15, a rear end 274 of the locking lever 250 pushes the contact pin 472 formed at the pushing lever 450 in a direction S by the rotation of the locking lever 250. As the pushing lever 450 is pushed in the direction S, the guide pin 464 formed at one end of the pushing lever 450 is unlocked from the first locking portion 374 formed at the second pivot plate 350 (operation S2).

Figure 16:
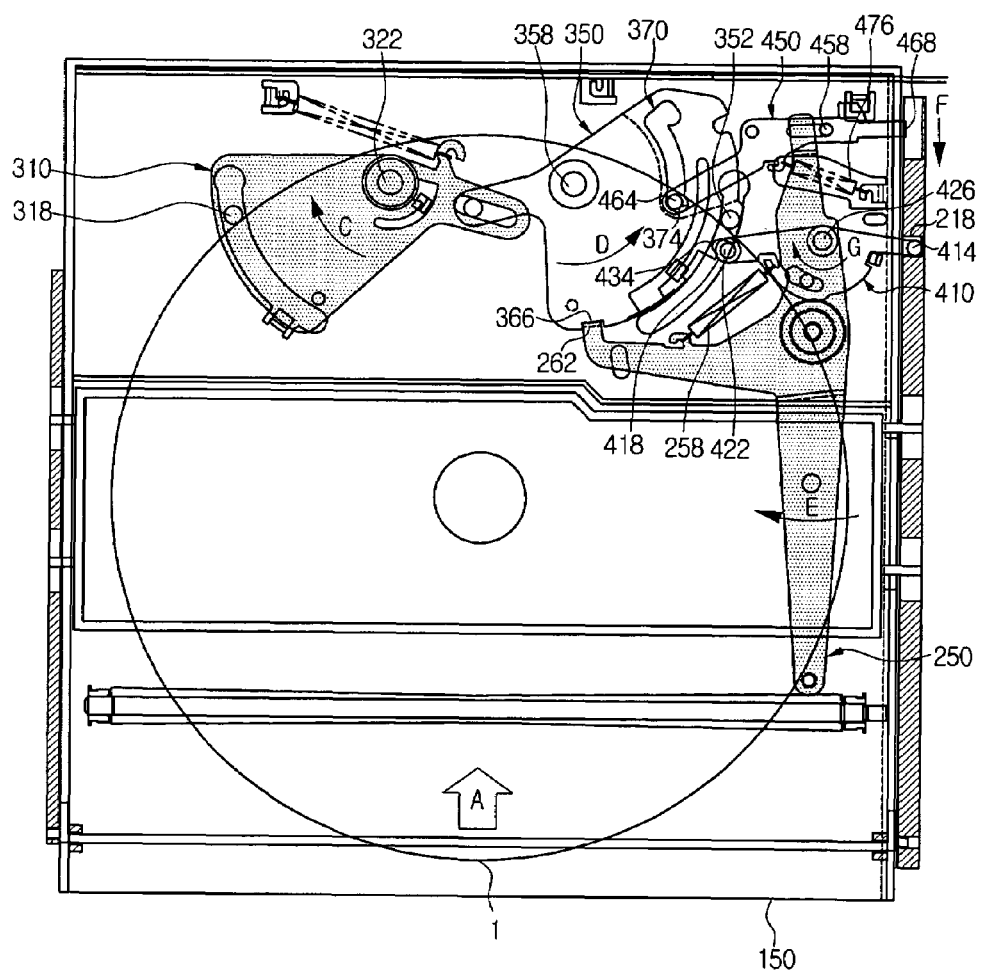

In FIG. 16, the first disk 1 is continuously moved in the direction A, and the first disk 1 pushes the first and second guide pins 318 and 352 each formed at the first and second pivot plates 310 and 350. As such, the first and second pivot plate 310 and 350 are rotated around the pivot shafts 322 and 358 in the directions C and D, respectively. At that time, the locking lever 250 is returned in a direction E along an outer periphery of the first disk 1 by a resilient force of the resilient member 258 installed between the locking lever 250 and the releasing lever 410. When the first disk 1 reaches the chucking position, the locking boss 262 formed at the locking lever 250 is inserted into the second locking groove 366 formed at the second pivot plate 350, so that the locking lever 250 is locked. The first disk 1 is loaded into the chucking position through the above process (operation S3).

When the guide pin 464 moves along the guide slit 370, the pushing lever 450 is positioned at the first locking portion 374 formed at one end of the guide slit 370. Specifically, when the guide pin 464 approaches the first locking portion 374, the guide pin 464 is locked into the first locking portion 374 by the resilient force of the resilient member 476 provided at the pushing lever 450 and the main chassis 150. At that time, when the first disk 1 is moved further up to push the second guide pin 352, the guide pin 464 that is locked into the first locking portion 374 provided at the pushing lever 450 is pushed, and the pushing lever 450 is rotated around the pivot shaft pin 458 (operation S4).

One end 468 of the pushing lever 450 pushes the first slider 210 in the direction F by the rotation of the pushing lever 450. As the rack gear 212 formed at the first slider 210 meshes with the drive gear 612, the first slider 210 pushed in the direction F is moved in the same direction by means of the motor 604 (FIG. 13) (operation S5).

When the slider 210 is moved in the direction F, the releasing lever 410 of which one end 414 is inserted into the second interlocking groove 218 formed at the first slider 210 is rotated around the pivot shaft 426 in the direction G. When the releasing lever 410 is rotated in the direction G, the releasing lever pin 422 provided at the other end 418 of the releasing lever 410 is locked into the first releasing groove 434 formed at the second pivot plate 350.

Figure 17:
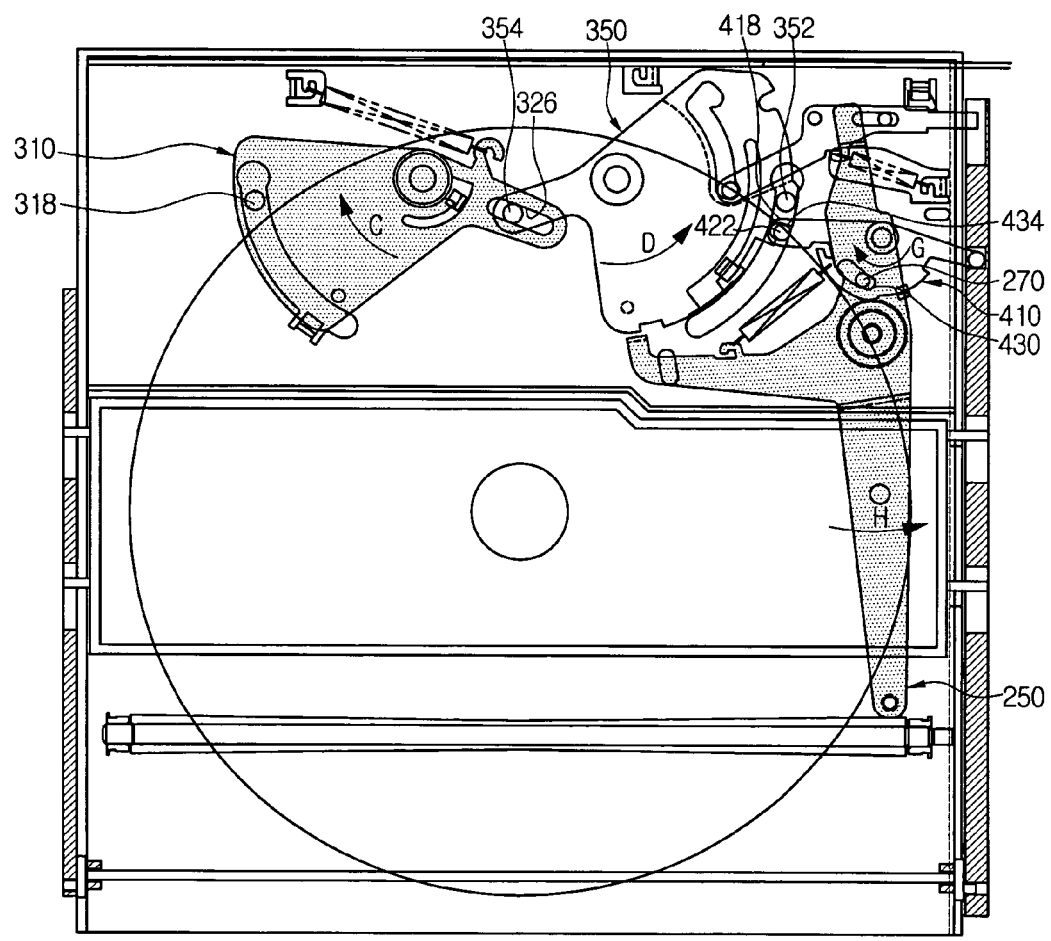

In FIG. 17, as the releasing lever 410 is rotated in the direction G, the cam boss 270 formed at the locking lever 250 moves along the cam groove 430 formed at the releasing lever 410. Specifically, the cam boss 270 of the locking lever 250 that is inserted into the cam groove 430 rotates the locking lever 250 in a direction H in cooperation with the rotation of the releasing lever 410. The rotation of the locking lever 250 causes the second pivot plate 350 to be unlocked.

At that time, the releasing lever pin 422 provided at the other end 418 of the releasing lever 410 has been inserted into the first releasing groove 434 formed at the second pivot plate 350. The second pivot plate 350 unlocked by the releasing lever 410 which is rotated in the direction G is rotated in the direction D. As the second pivot plate 350 is rotated in the direction D, the second guide pin 352 which is in contact with the first disk 1 is spaced apart from the first disk 1. The pin 354 formed at the second pivot plate 350 is interlocked into the hole 326 formed at the first pivot plate 310 to rotate the first pivot plate 310 in the direction C by the second pivot plate 350 which is rotated in the direction D. As the first and second pivot plates 310 and 350 are rotated in the directions C and D, respectively, the first and second guide pins 318 and 352 each formed at the first and second pivot plates 310 and 350, which are in contact the first disk 1, are spaced apart from the first disk 1 (operation S6).

Next, a process of loading the second disk 2 of 80 mm will now be described.

Figure 18:
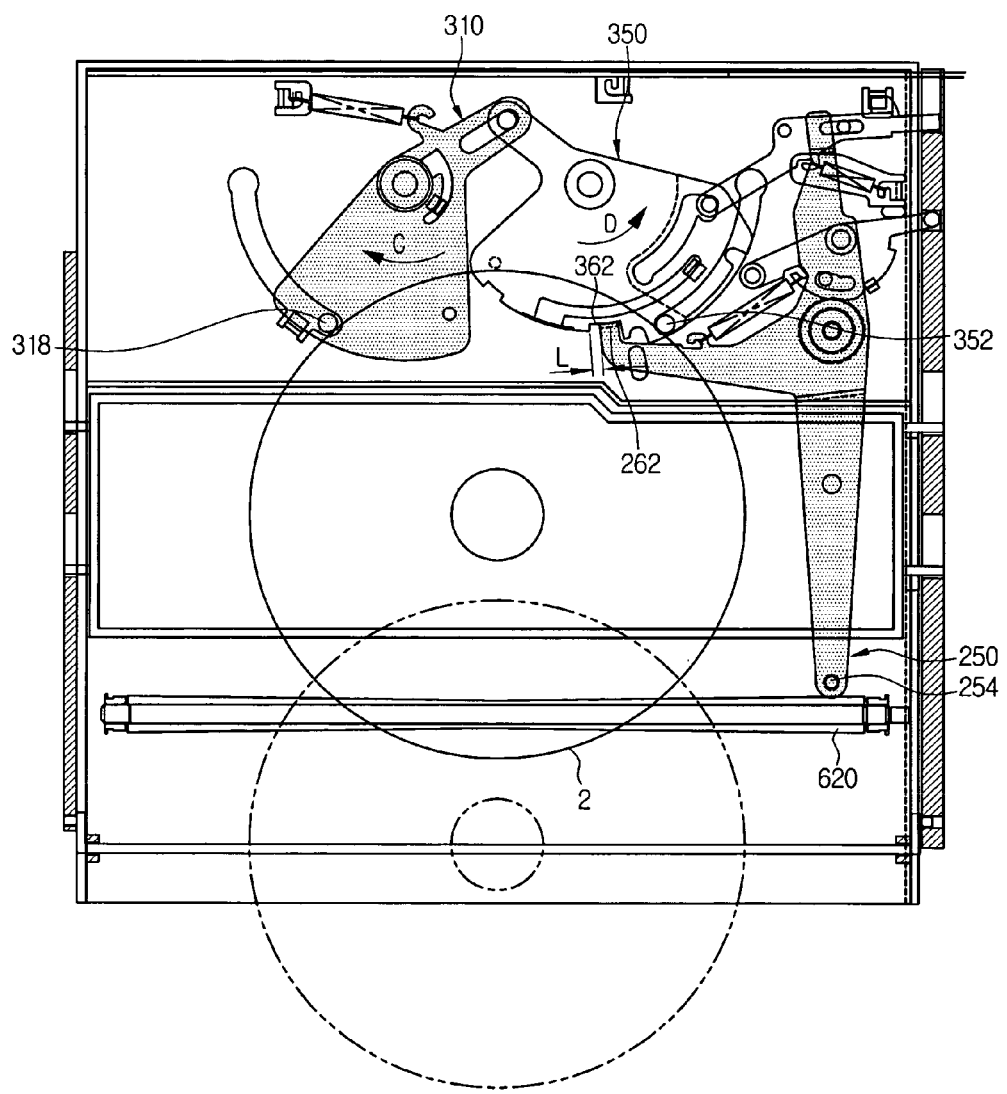
FIGS. 18 through 20 are views illustrating a process of loading a disk of 80 mm onto a disk loading apparatus according to an embodiment the present invention.

As illustrated in FIG. 18, the second disk 2 is inserted in a loading direction, that is, direction A, which is injected into the housing 100 (FIG. 13), as the first disk 1. It is determined by a sensor (not illustrated) whether the second disk 2 is injected or not. The drive motor 604 (FIG. 13) is driven by a signal from the sensor to rotate the transferring roller 620. As such, the second disk 2 is pulled into the housing 100 (operation S1).

At that time, the second disk 2 is not in contact with the interfering pin 254 of the locking lever 250, different from the loading process of the first disk 1. Accordingly, the first and second pivot plates 310 and 350 are not rotated.

Figure 19:
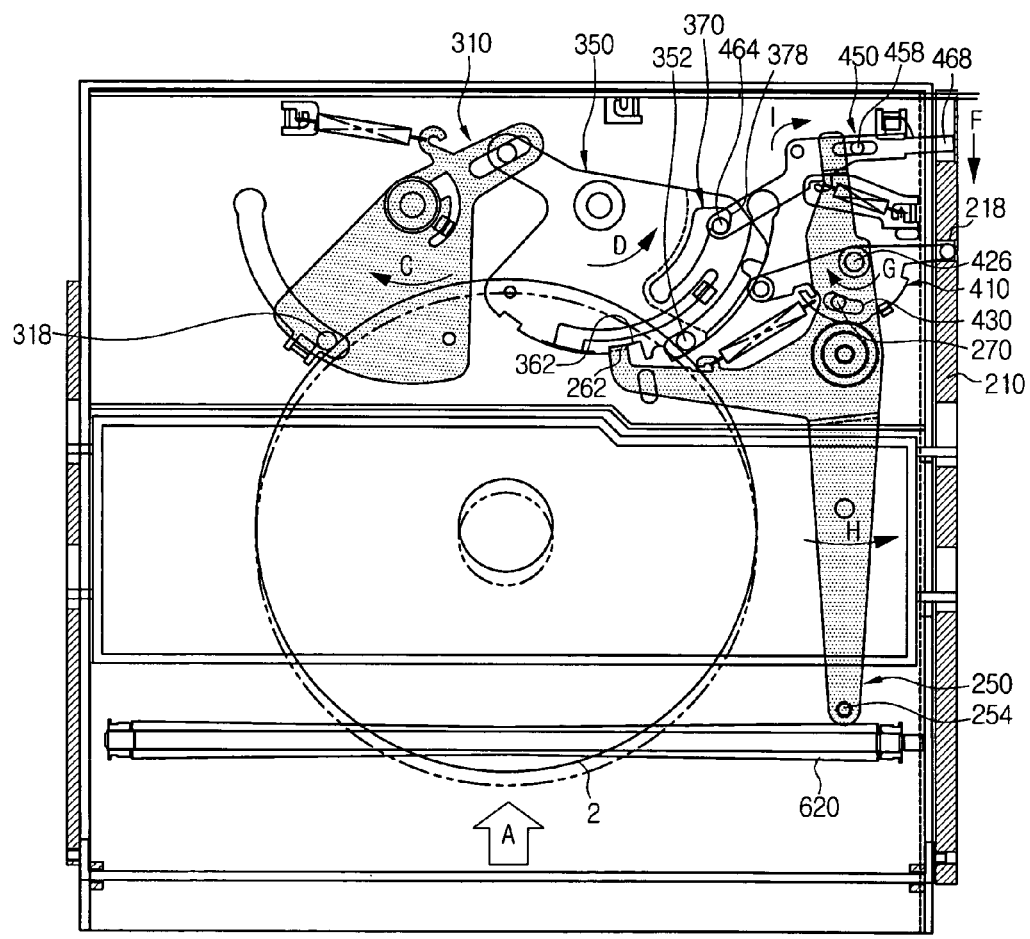

As the second disk 2 is continuously injected to come into contact with the first and second guide pins 318 and 352 of the first and second pivot plates 310 and 350. After the contact, the second disk 2 further pushes the first and second guide pins 318 and 352 in the loading direction. As such, the first and second pivot plate 310 and 350 are rotated in the directions C and D, respectively. At that time, the locking boss 262 of the locking lever 250 is moved by a distance L on the first locking groove 362. As illustrated in FIG. 19, the second disk 2 has been loaded into the chucking position through the above process (operation S2).

In FIG. 19, the second locking portion 378 pushes the guide pin 464 provided to one end of the pushing lever 450, and the pushing lever 450 is rotated around the pivot shaft pin 458 in a direction I (operation S3).

One end 468 of the pushing lever 450 pushes the first slider 210 in the direction F by the rotation of the pushing lever 450. As the rack gear 212 (FIG. 13) of the first slider 210 that is pushed in the direction F meshes with the drive gear 612 (FIG. 13), the first slider 210 is further moved in the direction F by means of the motor 604 (FIG. 13) (operation S4).

When the slider 210 is moved in the direction F, the releasing lever 410 inserted into the second interlocking groove 218 formed at the first slider 210 is rotated around the pivot shaft 426 in the direction G. When the releasing lever 410 is rotated in the direction G, the cam boss 270 formed at the locking lever 250 moves along the cam groove 430 formed at the releasing lever 410. Specifically, the cam boss 270 of the locking lever 250 inserted into the cam groove 430 rotates the locking lever 250 in a direction H in cooperation with the rotation of the releasing lever 410. The rotation of the locking lever 250 causes the second pivot plate 350 to be unlocked.

Figure 20:
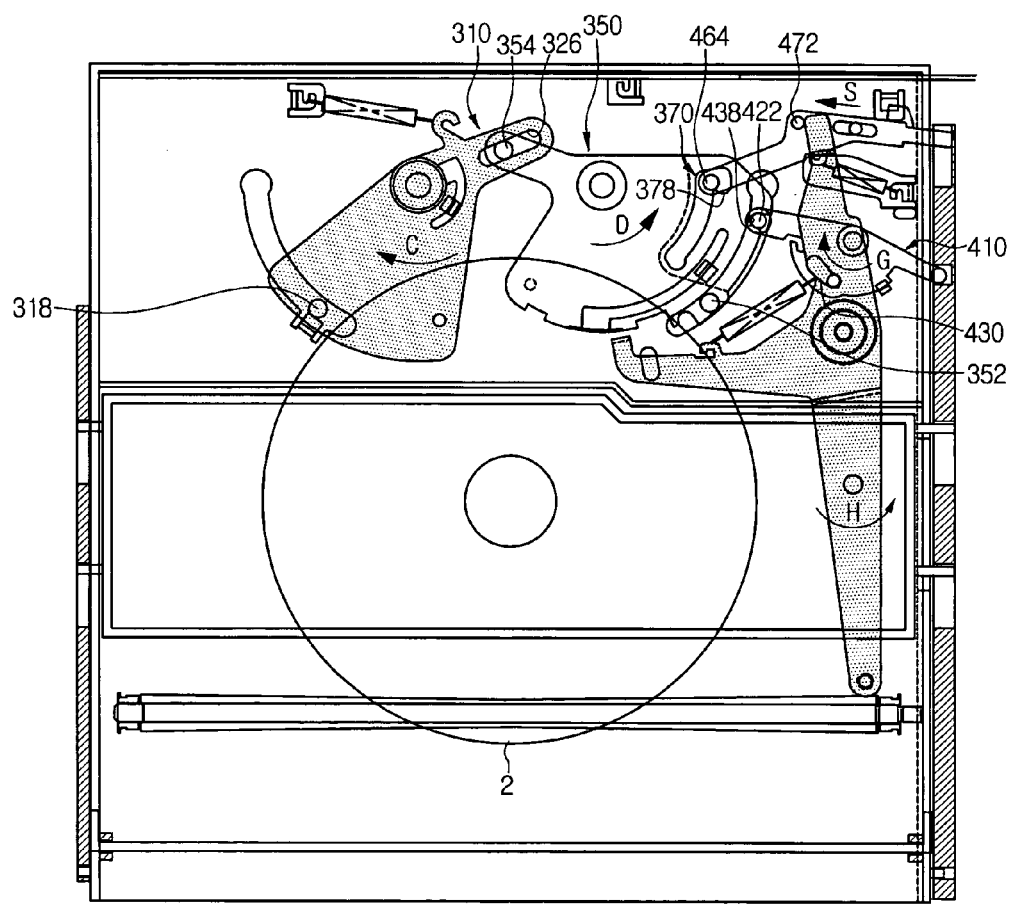

In FIG. 20, the releasing lever pin 422 provided at the other end 418 of the releasing lever 410 has been inserted into the second releasing groove 438 formed at the second pivot plate 350. The locking lever 250 is rotated in a direction H to push the contact pin 472 provided at one end of the pushing lever 450 in the direction S. As such, the guide pin 464 formed at one end of the pushing lever 450 is unlocked from the second locking portion 378 formed at the other end of the guide slit 370. The unlocked second pivot plate 350 is rotated in the direction D in cooperation with the rotation of the releasing lever 410 in the direction G. As the second pivot plate 350 is rotated in the direction D, the second guide pin 352 which is in contact with the second disk 2 is spaced apart from the second disk 2. The pin 354 formed at the second pivot plate 350 is interlocked into the hole 326 formed at the first pivot plate 310 to rotate the first pivot plate 310 in the direction C. As the first and second pivot plates 310 and 350 are rotated in the directions C and D, respectively, the first and second guide pins 318 and 352 each formed at the first and second pivot plates 310 and 350 which are in contact with the second disk 2 are spaced apart from the second disk 2 (operation S6).

The above process can reduce the number of interlocking components for loading and unloading the disk, and decrease the loss of the power because of effectively transferring the power from the drive motor 604. In addition, since it has a simple construction, it can decrease the malfunction upon implementing the loading and releasing process.

As illustrated in FIGS. 21A through 22B, when the first slider 210 is moved in the direction F, the second slider 220 coupled to the first slider 210 through the coupling member 518 is also moved in the direction F. At that time, the cam boss 510 formed at the chucking unit 500 is moved along the cam groove 514 formed at the first and second sliders 210 and 220 to move the chucking unit 500 down. As the chucking unit 500 is moved down, the first or second disk 1 or 2 is rotatably seated on the turntable 540.

Explaining the unloading process of the first and second loaded disk 1 or 2, first, the drive motor 604 is reversed in response to an unloading signal (FIG. 13). The slider 200 is moved in the direction opposite to the loading direction by the reverse of the drive motor 604, thereby unloading the disk through a process adverse to the above loading process.

With the above description, according to the disk loading apparatus and method of the present invention, the number of interlocking members for coupling the slider to the transmission unit can be reduced, and thus, help prevent the malfunction of the apparatus.

In addition, the disk player can be miniaturized because of the reduced number of the components.

Furthermore, there is a decrease in the loss of power in the process of transferring power from the disk loaded into the chucking position to the first interlocking unit.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for loading disks of different sizes, comprising:
   a main chassis to which a transferring roller for transferring a disk is installed;
   a transmission unit installed to the main chassis for transferring a power to the transferring roller;

a slider installed to the main chassis and moved in a direction of loading and unloading the disk;

a first interlocking unit installed to the main chassis for guiding the disk into a chucking position;

a second interlocking unit installed to the main chassis and operating in cooperation with the first interlocking unit and the slider; and a locking lever installed to the main chassis for selectively locking the first interlocking unit, wherein the first interlocking unit comprises a first pivot plate rotatably installed to the main chassis, a second pivot plate rotatably installed to the main chassis in cooperation with the first pivot plate and selectively locked into the locking lever, and a resilient member having one side coupled to the first pivot plate and the other end installed to the main chassis and resiliently biasing the first pivot plate, the second interlocking unit comprises a pushing lever pivotally installed to the main chassis and coupling the slider to the transmission unit in cooperation with the second pivot plate pushed and rotated by the disk, a releasing lever pivotally installed to the main chassis and rotating the second pivot plate in cooperation with the slider, and a resilient member having one side coupled to the main chassis and the other end installed to the pushing lever and resiliently biasing the pushing lever, the second pivot plate is formed with first and second locking grooves, the locking lever includes a locking boss locked into the first or second locking groove, and the first locking groove has a width greater than that of the locking boss, and the second pivot plate is formed with a guide slit having first and second locking portions interlocked with the pushing lever to couple the slider to the transmission unit and guiding a guide pin formed at one end of the pushing lever.

2. The apparatus according to claim 1, wherein the second pivot plate comprises a first releasing groove selectively coupled to one end of the releasing lever and a second releasing groove spaced apart from the first releasing groove at a desired distance so as to release the guide pin guiding the disk in cooperation with the releasing lever, each of the first and second releasing grooves provided at the first and second pivot plates.

3. The apparatus according to claim 2, wherein the releasing lever is formed with a cam groove, and the locking lever includes a cam boss which is moved along the cam groove to rotate the locking lever and thus unlock the second pivot plate.

4. The apparatus according to claim 1, further comprising a resilient member for coupling the locking lever and the releasing lever so that the locking lever and the releasing lever are resiliently biased.

* * * * *